(12) United States Patent
Speed et al.

(10) Patent No.: US 11,119,518 B2
(45) Date of Patent: Sep. 14, 2021

(54) VOLTAGE REGULATION CIRCUIT

(71) Applicant: Econopower Pty Ltd, MacMasters Beach (AU)

(72) Inventors: Shaune Speed, MacMasters Beach (AU); Mark Barber, MacMasters Beach (AU)

(73) Assignee: ECONOPOWER PTY LTD, Macmasters Beach (AU)

( * ) Notice: Subject to any disclaimer, the term of this patent is extended or adjusted under 35 U.S.C. 154(b) by 0 days.

(21) Appl. No.: 16/651,834

(22) PCT Filed: Aug. 31, 2018

(86) PCT No.: PCT/AU2018/000157
§ 371 (c)(1),
(2) Date: Mar. 27, 2020

(87) PCT Pub. No.: WO2019/060941
PCT Pub. Date: Apr. 4, 2019

(65) Prior Publication Data
US 2020/0249708 A1    Aug. 6, 2020

(30) Foreign Application Priority Data
Sep. 29, 2017   (AU) .............................. 2017903958

(51) Int. Cl.
*G05F 1/10* (2006.01)
*G05F 1/14* (2006.01)
*H02M 5/12* (2006.01)

(52) U.S. Cl.
CPC ................ *G05F 1/14* (2013.01); *H02M 5/12* (2013.01)

(58) Field of Classification Search
CPC ..... G05F 1/10; G05F 1/12; G05F 1/13; G05F 1/14; G05F 1/147; G05F 1/32; H02M 5/12; H02M 5/42; H01F 29/02; H01F 29/04
See application file for complete search history.

(56) References Cited

U.S. PATENT DOCUMENTS

| 2,866,942 A | 12/1958 | Mamon | |
| 4,352,055 A * | 9/1982 | McCartney | G05F 1/30 323/263 |

(Continued)

FOREIGN PATENT DOCUMENTS

| GB | 2438880 A | 12/2007 |
| SU | 940147 A1 | 6/1982 |

OTHER PUBLICATIONS

International Search Report for PCT/AU2018/000157, dated Nov. 8, 2018, 3 pages, Australia.

(Continued)

*Primary Examiner* — Adolf D Berhane
(74) *Attorney, Agent, or Firm* — Stinson LLP

(57) ABSTRACT

The present disclosure relates to a voltage regulation circuit (100). The voltage regulation circuit (100) comprises a transformer (130) having a primary winding (132) having a first end (132A) and a second end (132B), and a first secondary winding (134) having a first end (134A) and a second end (134B), wherein the first end (132A) of the primary winding (132) is configured to receive an input voltage and the second end (132B) of the primary winding (132) is configured to produce an output voltage, wherein the first end (134A) of the first secondary winding (134) is connected to a neutral node (180), wherein the primary winding (132) produces a primary voltage based on the input voltage, and wherein a secondary voltage of the first secondary winding (134) is out-of-phase to the primary voltage (Continued)

of the primary winding (132); and a first switch (160) configured to connect the second end (134B) of the first secondary winding (134) with the second end (132B) of the primary winding (132), wherein, when the first switch (160) is connected, the output voltage is the secondary voltage.

15 Claims, 3 Drawing Sheets

(56) References Cited

U.S. PATENT DOCUMENTS

| | | | | |
|---|---|---|---|---|
| 5,272,615 | A * | 12/1993 | Wert | H02M 7/48 |
| | | | | 363/41 |
| 6,995,547 | B2 * | 2/2006 | Yuan | H02M 3/155 |
| | | | | 323/222 |
| 2004/0114404 | A1 * | 6/2004 | Brkovic | H02M 3/28 |
| | | | | 363/80 |
| 2005/0024027 | A1 | 2/2005 | McVicar | |
| 2007/0296390 | A1 * | 12/2007 | Feigin | H02M 5/22 |
| | | | | 323/290 |
| 2014/0204614 | A1 * | 7/2014 | Elam | H02M 7/21 |
| | | | | 363/16 |
| 2015/0326132 | A1 * | 11/2015 | Herbert | H01F 38/00 |
| | | | | 363/21.04 |
| 2017/0331387 | A1 * | 11/2017 | Gougerchian | H01F 27/33 |

OTHER PUBLICATIONS

Written Opinion for PCT/AU2018/000157, dated Nov. 8, 2018, 4 pages, Australia.

* cited by examiner

VOLTAGE REGULATION CIRCUIT

STATEMENT OF RELATED CASES

This application is a national application filed under 35 U.S.C. § 371 of International Application No. PCT/AU2018/000157, filed Aug. 31, 2018, which claimed priority to Australian Patent Application No. 2017903958, filed Sep. 29, 2017, the entire contents of both of which are incorporated herein by reference in their entireties.

TECHNICAL FIELD

The present invention relates generally to voltage regulation and, in particular, to voltage regulation of mains electricity using a non isolated transformer circuit.

BACKGROUND

Mains electricity delivered to homes and offices is typically higher then specified. For example, in Australia, the mains electricity is specified as having a voltage of 220 Vac, but typically the mains electricity is delivered at a voltage of 255 Vac. The higher voltage leads to a higher current at an appliance (i.e., a load), which ultimately results in a higher power being dissipated by the appliance.

There are two major impacts resulting from the higher voltage. First, the higher voltage and current put electrical stress on appliances and reduces the lifespan of the appliances. Second, the increased power equates to an increase in power consumption and costs.

Conventional voltage reduction methods involve significant modification to the input voltage and often lead to significant energy losses. Therefore, such conventional methods are not suitable in reducing the voltage of mains electricity.

Therefore, there is a need to provide a voltage reduction technique that is highly efficiency (i.e., minimal loss of energy during regulation).

SUMMARY

Disclosed are arrangements which seek to provide a voltage reduction with high efficiency (i.e., minimal energy loss).

An aspect of the present disclosure provides a voltage regulation circuit that is capable of reducing the voltage of mains electricity by a certain voltage (e.g., 30 Vac) using a non-isolated series transformer.

According to a first aspect of the present disclosure, there is provided a voltage regulation circuit comprising: a transformer having a primary winding having a first end and a second end, and a first secondary winding having a first end and a second end, wherein the first end of the primary winding is configured to receive an input voltage and the second end of the primary winding is configured to produce an output voltage, wherein the first end of the first secondary winding is connected to a neutral node, wherein the primary winding produces a primary voltage based on the input voltage, and wherein a secondary voltage of the first secondary winding is out-of-phase to the primary voltage of the primary winding; a first switch configured to connect the second end of the first secondary winding with the second end of the primary winding, wherein, when the first switch is connected, the output voltage is the secondary voltage.

Other aspects are also disclosed.

BRIEF DESCRIPTION OF THE DRAWINGS

At least one embodiment of the present invention will now be described with reference to the drawings, in which.

DETAILED DESCRIPTION INCLUDING BEST MODE

Figure 1:
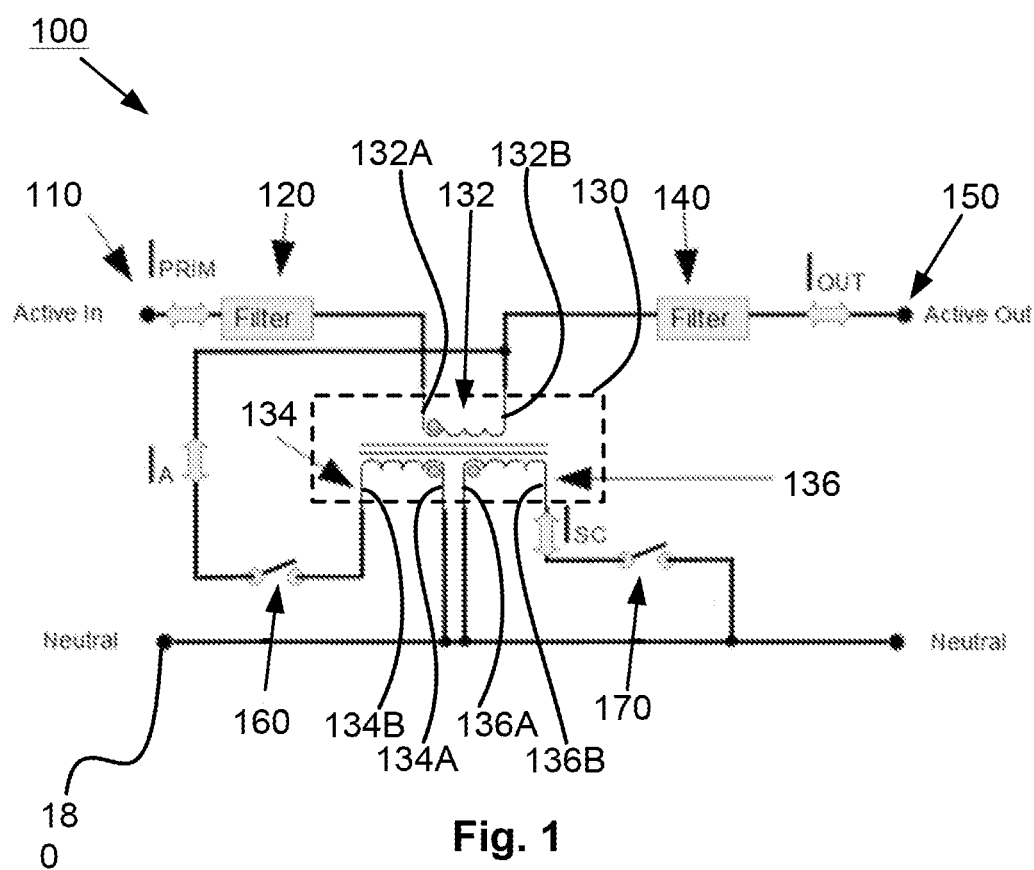
FIG. 1 shows a voltage regulation transformer circuit in accordance with an aspect of the present disclosure.

Where reference is made in any one or more of the accompanying drawings to steps and/or features, which have the same reference numerals, those steps and/or features have for the purposes of this description the same function (s) or operation(s), unless the contrary intention appears.

FIG. 1 shows a voltage regulation transformer circuit 100 having an input filter 120, an output filter 140, a series transformer 130, a first switch 160, and a second switch 170. An input voltage of the voltage regulation transformer circuit 100 is applied to an input node 110 and a neutral node 180. An output voltage of the voltage regulation transformer circuit 100 is provided between an output node 150 and the neutral node 180.

The series transformer 130 includes a primary winding 132, a first secondary winding 134, and a second secondary winding 136. As indicated by the dots, the winding polarities of the primary winding 132 and the first secondary winding 134 are 180° out-of-phase. Also indicated by the dots, the winding polarities of the primary winding 132 and the second secondary winding 136 are in-phase (i.e., a phase shift of 0°).

The secondary voltage at the first secondary winding 134 (which is induced by the primary voltage of the primary winding 132) depends on the ratio of the windings between the primary winding 132 and the first secondary winding 134. The ratio between the primary winding 132 and the first secondary winding 134 can be adjusted by varying the number of turns in the first secondary winding 134. The number of turns in the first secondary winding 134 can be varied using a tap (not illustrated).

Other components such as switch protection devices, diode bridges, and the like have been omitted for clarity purposes.

The input node 110 is connected to the filter 120. The filter 120 is a low pass filter to remove high frequency components of the input voltage that might affect the voltage regulation transformer circuit 100. The cutoff frequency of the low pass filter 120 can be set at a value to ensure that noise at the input node 110 has minimal effects to the circuit 100. The input filter 120 has a switch capacitance to allow its characteristics to be changed as required during active regulation. In one arrangement, the input is the mains electricity. The filter 120 in turn is connected to a first end (marked by the dot) 132A of the primary winding 132. A second end 132B of the primary winding 132 is connected to the output filter 140, which in turn is connected to the output node 150. The output filter 140 is a low pass filter to smooth the output voltage and remove unwanted high frequency components resulting from the voltage regulation transformer circuit 100. The cutoff frequency of the low pass filter 140 can be set at above 50/60 Hz to remove the effects of the control signals 310 and 320 (described hereinafter in relation to FIG. 3). A first end (marked by the dot) 134A of the first secondary winding 134 is connected to the neutral node 180. A second end 134B of the first secondary winding 134 is connected to the switch 160. The switch 160 is in turn connected to the second end 132B of the primary winding 132.

When the switch 160 is closed (i.e., connected), the second end 134B of the first secondary winding 134 is connected to the second end 132B of the primary winding 132. The switch 170 must be open (i.e., disconnected) at this stage. If the switch 170 is closed at the same time as the switch 160 is closed, there is effectively a short circuit across the primary winding 132 and the first secondary winding 134. In other words, when the switches 160 and 170 are closed at the same time, there is a short circuit across the input node 110 and the neutral node 180.

Figure 4A:
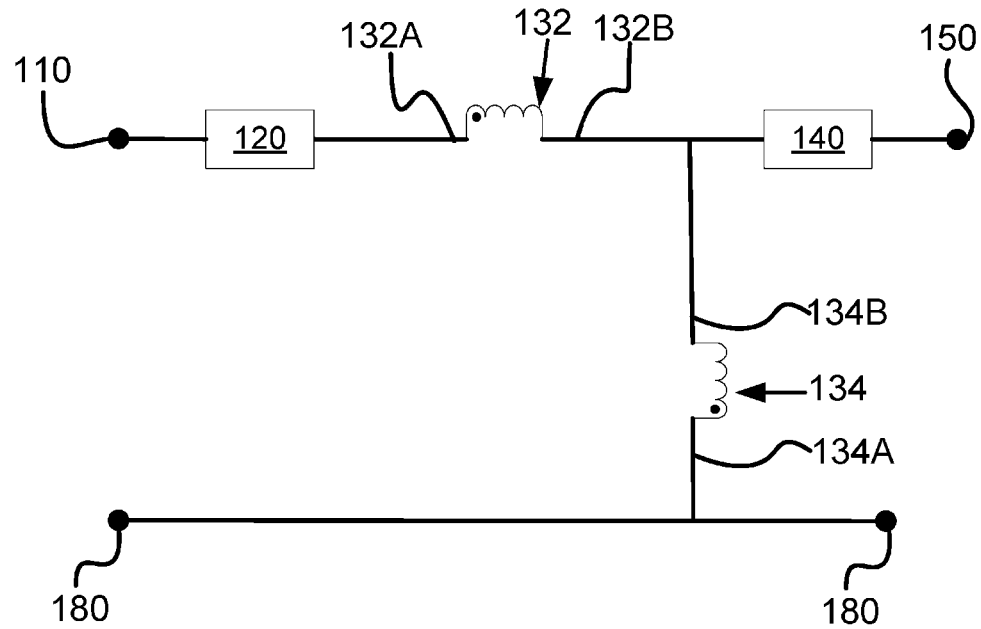
FIGS. 4A to 4C show equivalent circuits of certain parts of the voltage regulation transformer circuit of FIG. 1.

FIG. 4A shows an equivalent circuit of the connection between the primary winding 132 and the first secondary winding 134 when the switch 160 is closed and the switch 170 is open. As seen in FIG. 4A, when the switch 160 is closed and the switch 170 is open, then the voltage at the second end 132B is the secondary voltage of the first secondary winding 134 and the output voltage at the output node 150 is the secondary voltage of the first secondary winding 134 that is filtered by the output filter 140.

When the switch 160 is closed and the switch 170 is open, current flows in the primary winding 132 generating a first flux in the core of the transformer 130. The first flux then induces current to flow in the first secondary winding 134, which generates a second flux that is opposite to the first flux. As the first flux and the second flux are opposite, the net result in a reduction in the flux in the core of the transformer 130, which means that the primary voltage across the primary winding 132 is reduced.

When the switch 160 is open (i.e., disconnected), the second end 134B of the first secondary winding 134 is disconnected from the second end 132B of the primary winding 132. The switch 170 can be either closed or open at this stage. This configuration results in an open circuit for the first secondary winding 134, which means the secondary voltage across the first secondary winding 134 is not generated.

Figure 4B:
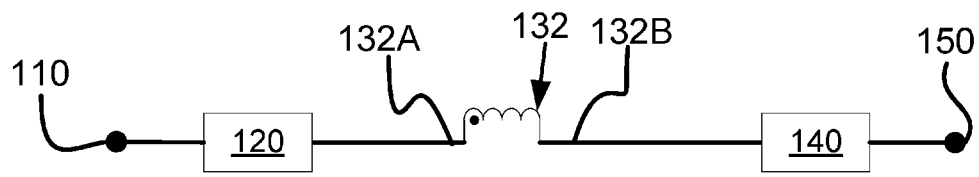
Figure 4B:

FIG. 4B shows an equivalent circuit of the connection between the primary winding 132 and the first secondary winding 134 when the switches 160 and 170 are open. As seen in FIG. 4B, when the switch 160 is open, then the output voltage at the output node 150 is effectively the input voltage reduced by voltage drops across the input filter 120, the primary winding 132, and the output filter 140. The situation where both 160 and 170 are open is not ideal and only happens during transition of the alternate closing of the switches 160 and 170.

The connection between the primary winding 132 and the second secondary winding 136 is now described. A first end (marked by the dot) 136A of the second secondary winding 136 is connected to the neutral node 180. A second end 136B of the second secondary winding 136 is connected to the switch 170. The switch 170 is in turn connected to the neutral node 180.

When the switch 170 is closed (i.e., connected) while the switch 160 is open, the second end 136B of the second secondary winding 136 is connected to the neutral node 180. This configuration results in a short circuit in the second secondary winding 136. The impedance in the short-circuited second secondary winding 136 is then reflected to the primary winding 132. This results in the primary winding having a nominal impedance of zero due to the reflected impedance from the short-circuited second secondary winding 136. The voltage at the second end 132 is effectively the input voltage, while the output voltage at the output node 150 is then effectively the input voltage at the input node 110 that is filtered by the output filter 140. When the switch 170 is closed, the switch 160 must be open to prevent creating a short circuit across the primary winding 132 and the first secondary winding 134 as described hereinbefore.

Figure 4C:
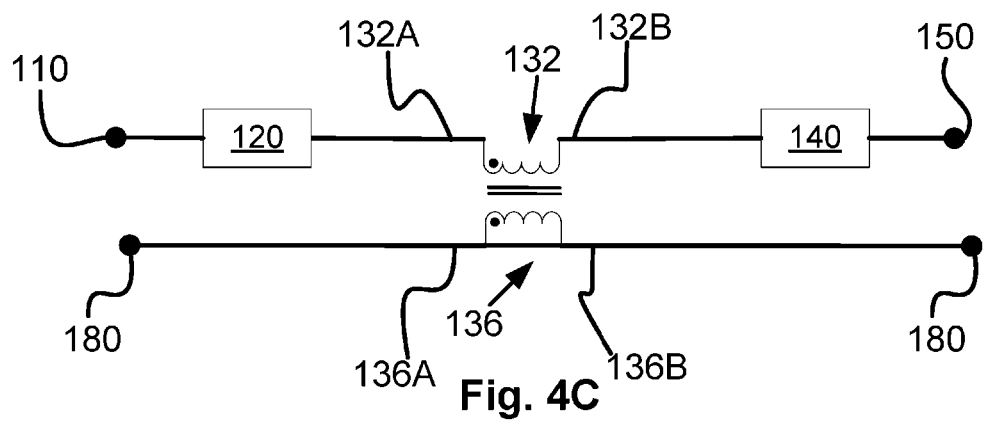

FIG. 4C shows an equivalent circuit of the connection between the primary winding 132 and the second secondary winding 136 when the switch 170 is closed and the switch 160 is open. As seen in FIG. 4C, the output voltage is effectively the input voltage at the input node 110.

Table 1 below shows the relationships between the input voltage applied at the input node 110, the output voltage at the output node 150, and the state of the switches 160 and 170:

TABLE 1

| Switch 160 | Switch 170 | Input Voltage at the input node 110 | Secondary Voltage at the first secondary winding 134 | Output Voltage at the output node 150 |
|---|---|---|---|---|
| Closed | Open | Vin | Vs | Vs (220—see FIG. 2B) |
| Open | Closed | Vin | 0 | Vin (effectively 210—see FIG. 2B) |
| Open | Open | Vin | 0 | Vin (effectively 210—see FIG. 2B) |
| Closed | Closed | Vin | Vs | NA |

In one example, an input voltage of 250 Vac is applied at the input node 110 and the neutral node 180. The ratio of the windings between the primary winding 132 and the first secondary winding 134 is calculated to deliver the required voltage drop, and then the out-of-phase secondary voltage of the first secondary winding 134 induced by the primary winding 132 is a ratio of the turns, of the primary voltage. As an example, if the ratio of the windings between the primary winding 132 and the first secondary winding 134 is 10 to 9, then the out-of-phase secondary voltage of the first secondary winding 134 induced by the primary winding 132 is $9/10^{th}$ of the primary voltage. Therefore, the out-of-phase secondary voltage of the first secondary winding 134 in this example is 225 Vac.

When the switch 160 is closed and the switch 170 is open, the voltage at the second end 132B is 225 Vac (i.e., the secondary voltage of the first secondary winding 134. When the switch 160 is open and the switch 170 is closed, the voltage at the second end 132B is 250 Vac (assuming the voltage drops across the filter 120 and the primary winding 132 are negligible). When the switch 160 is open and the switch 170 is open, the voltage at the second end 132B is 250 Vac (assuming the voltage drops across the filter 120 and the primary winding 132 are negligible). As described hereinafter, the switches 160 and 170 are alternately closed, thereby changing the voltage at the second end 132B. In this example, the voltage at the second end 132B alternates between 225 Vac (when the switch 160 is closed and the switch 170 is open) and 250 Vac (when the switch 160 is open and the switch 170 is closed). The output voltage at the node 150 is therefore the average voltage at the second end 132, where the average voltage depends on the duration of the respective voltages of 225 Vac and 250 Vac at the second end 132B and the output filter 140.

As described hereinbefore, the switches 160 and 170 are never closed at the same time.

Figure 2A:
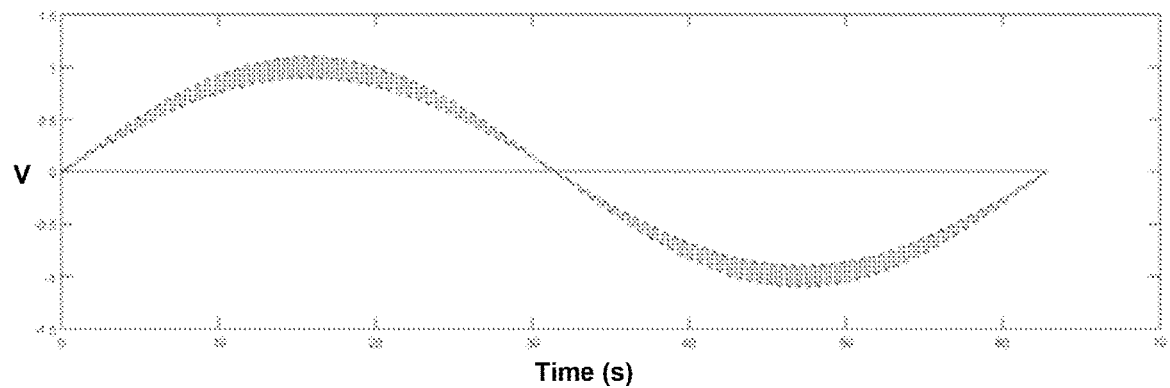
FIGS. 2A and 2B show an example of an output voltage waveform of the voltage regulation transformer circuit of FIG. 1.
Figure 2B:
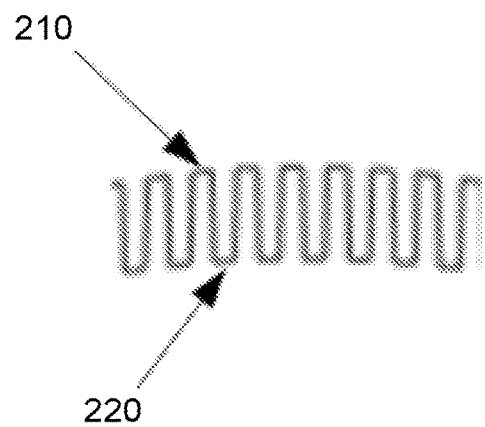
Figure 3:
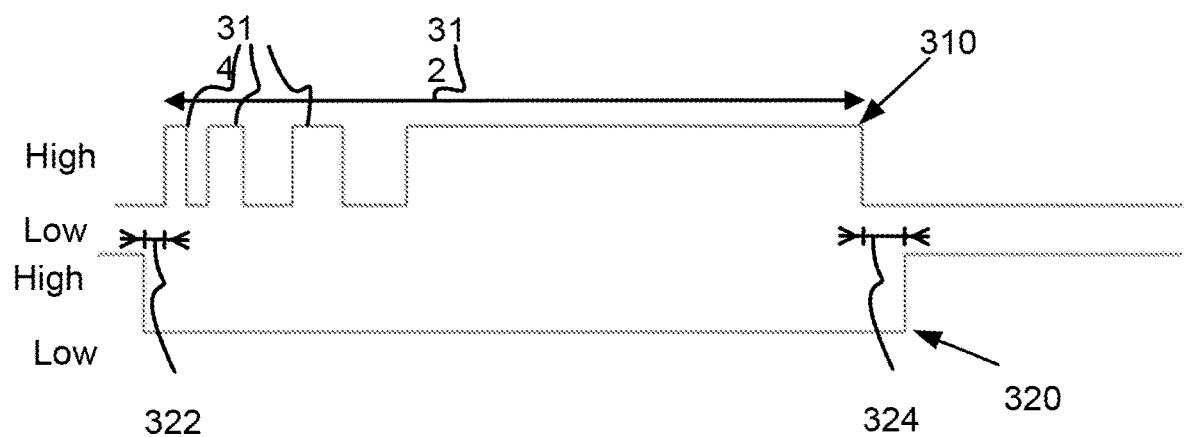
FIG. 3 shows control signals that are applied to the voltage regulation transformer circuit of FIG. 1 to generate the output voltage waveform shown in FIGS. 2A and 2B.

FIG. 2A shows the output voltage waveform at the second end 132B when the switches 160 and 170 are being switched in an closed/open sequence (which are associated with the control signals shown in FIG. 3). FIG. 2B shows an enlarged view of the voltage waveform shown in FIG. 2A. The voltage at the level indicated by the reference numeral 210 is effectively the input voltage at the input node 110. When the switch 160 is closed, the voltage drops to the level indicated by the reference numeral 220.

FIG. 3 shows two control signals 310 and 320 where a first control signal 310 controls the switching of the switch 160 and a second control signal 320 controls the switching of the switch 170. When the first control signal 310 is high, then the switch 160 is closed. The switch 160 is open when the first control signal 310 is low. When the second control signal 320 is high, then the switch 170 is closed. The switch 170 is open when the second control signal 320 is low.

The first and second control signals 310 and 320 are pulse width modulated signals. A pulse width 312 of the first control signal 310 corresponds to the duration that the switch 160 is closed. Therefore, the voltage drop at the second end 132B is regulated by the pulse width 312 of the first control signal 310.

The closing of the switch 160 by the first control signal 310 may cause inrush currents and voltage spikes. To minimise such inrush currents and voltage spikes, the first control signal 310 is pulsed at the beginning of the pulse width 312, as shown by the pulses 314, before the first control signal 310 is held at the high level.

The pulses 314 of the first control signal 310 are load adaptive, as the number of pulses 314, the width of each pulse 314, and the frequency of the pulses 314 are varied dependent on the load of the voltage regulation circuit 100. The number of pulses 314, the width of each pulse 314, and the frequency of the pulses 314 also determine the power efficiency of the voltage regulation circuit 100. The number of pulses 314 is increased when the output voltage of the circuit 100 is being used by higher loads.

The power factor of the voltage regulation circuit 100 can also be varied by varying the pulse width 312. The pulse width 312 effectively alters the output voltage waveform.

The switching of the control signals 310 and 320 is controlled by a processor or a Complex Programmable Logic Device (CPLD) (not shown). Changes in the duty cycle of the control signals 310 and 320 are used to control the output voltage.

The control signals 310 and 320 typically operate at 8 kHz, which would be removed by the low pass filters 120 and 140. The control signals 310 and 320, however, can operate at different switching frequencies.

In one arrangement, the voltage regulation circuit 100 and the associated components are limited to a maximum current. In the event that the current exceeds the maximum current, then the voltage regulation circuit 100 is shut down and a bypass relay (not shown) is activated to bypass the voltage regulation circuit 100. This ensures the voltage regulation transformer circuit 100 is protected and not over stressed.

As described hereinbefore, and in particular in Table 1, the switches 160 and 170 must not be closed at the same time. Therefore, when transitioning from the closing-to-opening of the switch 170 to the opening-to-closing of the switch 160, the second control signal 320 goes to the low level (i.e., opening the switch 170) in advance of the first control signal 310 going high (i.e., closing the switch 160). A pre-determined period 322, where both control signals 310 and 320 are held at the low position, is maintained between the second control signal 320 going low and the first control signal 310 going high to ensure that both switches 160 and 170 never close at the same time. Further, the transition period of when both of the control signals 310 and 320 are low provide a relaxation time to allow the switching transients to decay.

Similarly, when transitioning between the closing-to-opening of the switch 160 to the opening-to-closing of the switch 170, the first control signal 310 goes to the low level (i.e., opening the switch 160) in advance of the second control signal 320 going high (i.e., closing the switch 170). A pre-determined period 324, where both control signals 310 and 320 are held at the low position, is maintained between the first control signal 310 going low and the second control signal 320 going high to ensure that both switches 160 and 170 never close at the same time.

As described hereinbefore, the output voltage 150 is the average of the output voltage waveform at the second end 132B as determined by the output filter 140 and the duration of the respective voltages 210 and 220 as determined by the control signals 310 and 320.

INDUSTRIAL APPLICABILITY

The arrangements described are applicable to voltage regulation.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A voltage regulation circuit comprising:
   a transformer having a primary winding having a first end and a second end, and a first secondary winding having a first end and a second end, wherein the first end of the primary winding and a neutral node configured to receive an input voltage and the second end of the primary winding and the neutral node configured to produce an output voltage, wherein the first end of the first secondary winding is connected to the neutral node, wherein the primary winding produces a primary voltage based on the input voltage, and wherein a secondary voltage of the first secondary winding is out-of-phase to the primary voltage of the primary winding; and
   a first switch configured to connect the second end of the first secondary winding with the second end of the primary winding, wherein, when the first switch is connected, the output voltage is the secondary voltage.

2. The voltage regulation circuit of claim 1, wherein the transformer further comprising:
- a second secondary winding having a first end and a second end, wherein the first end of the second secondary winding is connected to the neutral node;
- and wherein the voltage regulation circuit further comprises a second switch configured to connect the second end of the second secondary winding to the neutral node,
- wherein, when the second switch is connected and the first switch is disconnected, the output voltage is substantially the input voltage, and
- wherein, when the second switch is disconnected and the first switch is connected, the output voltage is the secondary voltage.

3. The voltage regulation circuit of claim 1, further comprising:
- an input filter configured to receive the input voltage, to filter the input voltage, and to provide the filtered input voltage to the first end of the primary winding.

4. The voltage regulation circuit of claim 3, wherein the input filter is a low pass filter.

5. The voltage regulation circuit of claim 1, further comprising:
- an output filter configured to receive the output voltage, to filter the output voltage, and to provide the filtered output voltage.

6. The voltage regulation circuit of claim 5, wherein the output filter is a low pass filter.

7. The voltage regulation circuit of claim 2, further comprising:
- a processor or a Complex Programmable Logic Device configured to provide a first control signal to control the first switch and a second control signal to control the second switch.

8. The voltage regulation circuit of claim 7, wherein the first control signal and the second control signal are pulse width modulation signals.

9. The voltage regulation circuit of claim 8, wherein the first control signal comprises first pulses, wherein the start of each of the first pulses comprises second pulses configured to reduce voltage spikes in the voltage regulation circuit.

10. The voltage regulation circuit of claim 9, wherein the second pulses are dependent on a load of the voltage regulation circuit.

11. The voltage regulation circuit of claim 8, wherein the width of each of the first pulses of the first control signal controls a power factor of the output voltage.

12. The voltage regulation circuit of claim 2, further comprising:
- an input filter configured to receive the input voltage, to filter the input voltage, and to provide the filtered input voltage to the first end of the primary winding.

13. The voltage regulation circuit of claim 12, wherein the input filter is a low pass filter.

14. The voltage regulation circuit of claim 12, further comprising:
- an output filter configured to receive the output voltage, to filter the output voltage, and to provide the filtered output voltage.

15. The voltage regulation circuit of claim 14, wherein the output filter is a low pass filter.

* * * * *